United States Patent

[11] 3,562,539

[72] Inventors ~~N~~
~~Si~~...~~p~~...~~g~~,
Kenneth R. Hill, Severna Park, Md.
[21] Appl. No. 755,891
[22] Filed Aug. 28, 1968
[45] Patented Feb. 9, 1971
[73] Assignee the United States of America as represented by the Secretary of Agriculture

[54] APPARATUS FOR SCANNING THIN-LAYER AND OTHER CHROMATOGRAMS
5 Claims, 6 Drawing Figs.

[52] U.S. Cl. ............................................ 250/227, 350/96
[51] Int. Cl. ............................................ G02b 5/14, G02b 5/16
[50] Field of Search ............................. 250/227, 219I, 219ID; 350/96

[56] References Cited
UNITED STATES PATENTS

| | | | |
|---|---|---|---|
| 2,233,879 | 3/1941 | Tolman | 356/206 |
| 2,268,498 | 12/1941 | Bryce | 250/227X |
| Re23,023 | 8/1948 | Wolf et al. | 356/206X |
| | | ...mphrey | 250/227 |
| 3,463,927 | 8/1969 | Allington | 250/227X |

OTHER REFERENCES

M. Sokolski, " IMPROVED FIBER OPTIC READ HEAD" IBM Technical Disclosure Bulletin, V. 8, No. 11 Apr. 1966

H. R. Rottmann: "Electro-Optical Comparator" IBM Technical Disclosure Bulletin, V. 9, No. 6, Nov. 1966

L. K. Boeckh et al., " COMBINED READING OF PUNCHED HOLES AND MARKS," IBM Technical Disclosure, V. 10, No. 12, May 1968

*Primary Examiner*—Roy Lake
*Assistant Examiner*—David O'Reilly
*Attorney*—R. Hoffman and W. Bier

ABSTRACT: An apparatus for scanning thin-layer and other chromatograms containing a fiber optic scanning head consisting of randomly mixed glass fibers, half of which conducts light to a small defined area of the chromatogram and half of which conducts the reflected light to a photo-sensing cell for recording of its response on a strip chart recorder. A second fiber optic head scans the blank area adjacent to the spots to correct for background differences on the plate or other chromatogram supporting means.

INVENTORS
MORTON BEROZA
KENNETH R. HILL

BY R. Hoffman
ATTORNEY

APPARATUS FOR SCANNING THIN-LAYER AND OTHER CHROMATOGRAMS

A nonexclusive irrevocable, royalty-free license in the invention herein described, throughout the world for all purposes of the United States Government, with the power to grant sublicenses for such purposes is hereby granted to the Government of the United States of America.

This invention relates to a new apparatus that scans thin-layer or other chromatograms and provides a quantitative measure of the reflectance on a strip chart recorder. More particularly, it relates to a thin-layer or other chromatogram-scanning apparatus containing a fiber optic scanning head comprised of randomly mixed glass fibers which conduct light to a small defined area of the thin-layer or other chromatogram and conducts reflected light to a photo-sensing cell.

Although thin-layer chromatography (TLC) has been widely used for qualitative and some semiquantative estimations of a great variety of substances, it has been used very sparingly as a quantitative analytical tool. The value of this versatile technique would be much enhanced if suitable instrumentation for measuring TLC spots quantitatively were devised.

One object of the present invention is to assemble an instrument to measure the reflectance of TLC spots and to use these measurements to determine the quality of substance present in each spot.

Another object is to obtain the reflectance data in a form that is easily convertible to quantitative amounts of substance.

Still another object is to improve the speed and sensitivity of analyses.

A further object is to improve the selectivity of the TLC measurement and the specificity of analyses.

A still further object is to provide more certain identification of substances on a thin-layer plate than can be provided by $R_f$ value alone.

An additional object is to eliminate interference so that cleanup of sample is minimal.

Another additional object is to provide analytical procedures for such compounds as pesticides that cannot be analyzed by such usual means as gas chromatography.

A further additional object is to provide a unique device to make reflectance measurements without injuring the chromatogram.

One more additional object is to provide a permanent record of each chromatogram.

Yet another additional object is to obtain an unbiased electronic measurement of reflectivity to supplant the less accurate human-eye judgement of spot intensity now being used.

A still further additional object is to measure spot reflectances even when such spots are misshapen.

Another still further additional object is to allow measurements to be made of chromatograms on plastic TLC plates or paper.

In general, according to this invention, light from an incandescent bulb or from a monochromatic source is conducted to the area being monitored through two fiber optic conduits and two scanning heads, one for scanning the chromatogram and the other a reference for scanning the blank area adjacent to the chromatogram. Reflected light is picked up by glass fibers in the scanning heads and conducted to cadmium sulfide photocells which register their response on a recorder via a bridge circuit.

The invention will be described as an apparatus comprised of a dual light source, a dual fiber optic light conduit, a dual cadmium sulfide photocell, a bridge circuit and a strip-chart recorder. This description is for illustrative purposes only and is not to be construed as limiting the invention to this particular apparatus as anyone skilled in the art can readily ascertain that other elements can be substituted for those described without changing the fundamental concept of the invention.

Referring to the drawings.

Figure 1:
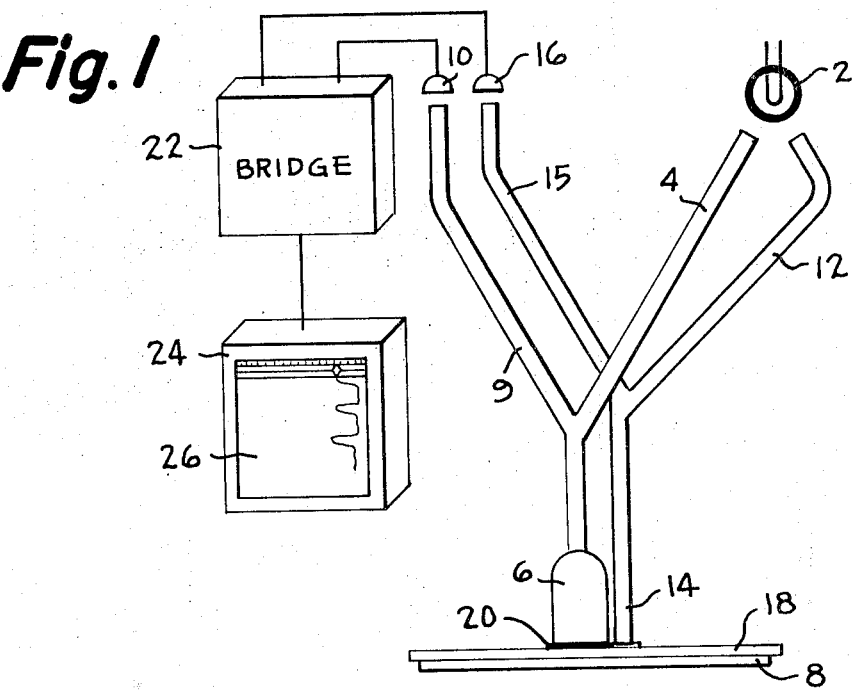
FIG. 1 is a schematic representation of a typical completely assembled apparatus.

As shown in FIG. 1, the apparatus comprises a light source 2, a scanning head glass fiber optic bundle 4 terminating in scanning head 6 which contains glass fibers that conduct light reflected from TLC plate 8 through glass fiber optic bundle 9 to photocell 10; a reference glass fiber optic bundle 12 terminating in reference head 14 which contains glass fibers that conduct reflected light from the blank area of the TLC plate 8 through glass fiber optic bundle 15 to photocell 16. Scanning head 6 rests on a conveniently sized (e.g. 20 ×25 × 1.5 mm.) transparent plate 18 which is made of glass or other suitable material. Plate 18 covers TLC plate 8 and maintains the head a constant distance from the absorbent, and a 3-mill thick Teflon strip 20 under head 6 allows the head to slide easily on plate 18. A Wheatstone-type bridge circuit 22 feeds the response of the photocells 10 and 16 to a recorder 24 which produces a strip chart tracing 26 of the photocells' response. In the arrangement illustrated, the scanning heads 6 and 14 are held stationary, side by side, on a freely pivoting rod, while TLC plate 8 moves under heads 6 and 14 at the rate of 3 inches per minute in the direction of development. Reference head 14 is clamped slightly higher than scanning head 6 and therefore does not slide on cover glass 18, nor is it covered with TEflon strip 20. For movement of the TLC plates a motor-driven carriage similar to those used with other laboratory instruments is used.

Figure 2:
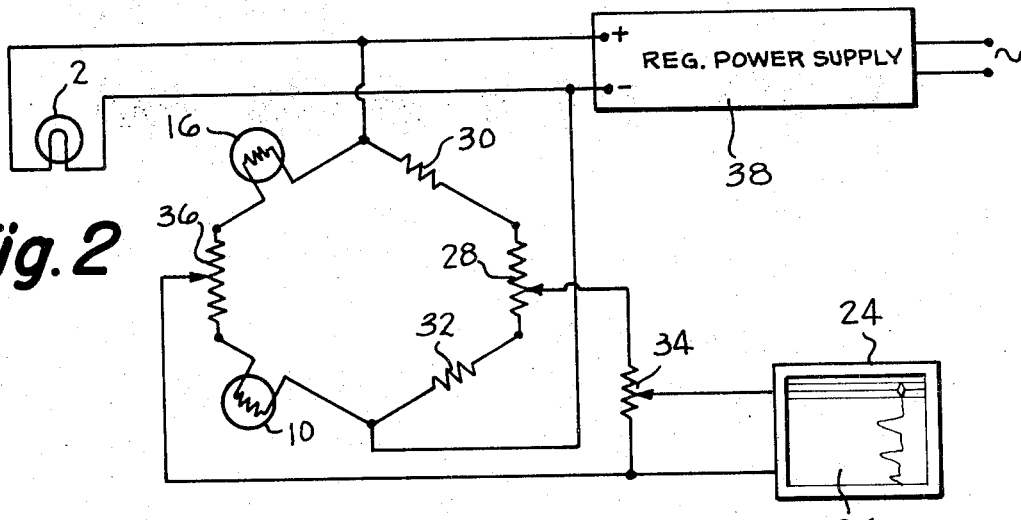
FIG. 2 is a schematic diagram of the bridge circuit.

Scanninghead 6 is used to scan the TLC spots and reference head 14 to scan he adjacent blank area. Each assembly is a Y-shaped bundle of randomly arranged glass fibers 24 inches long. One arm of each Y conducts light from light source 2, which in this illustration is a 10 volt incandescent bulb, to the surface of TLC plate 8 while the other conducts reflected light to cadmium sulfide (CdS) photocells 10 and 16. The glass fibers of the two arms are interspersed randomly in the lower portion of the Y to form a common bundle of glass fibers ¼ inch in diameter. The scanning head common bundle terminates in a 2 × 20 mm. rectangular array of fibers 6, and the reference head 14 terminates in a circular array ¼ inch in diameter. FIG. 2 is a schematic diagram of a suitable circuit and is for illustrative purposes only and is not intended to be limiting since many other circuits can be used within the scope of the fundamental concept of this invention. Each CdS cell (10 and 16) forms one arm of a Wheatstone bridge with a 10-turn 500-ohm potentiometer 28 and two 100-ohm resistors 30 and 32 serve as the other two arms. The unbalanced output from the bridge is attenuated by a 10K-ohm linear taper potentiometer 34 with a 10-ohm potentiometer 36 for fine balance and fed to a strip chart recorder 24. Power for the bridge and light bulb is supplied by a 10-volt regulated solid state power supply 38 rated at less than 500 microvolts ripple.

For scanning colored spots with monochromatic light, the light output of a Model DU Beckman spectrophotometer can be used for light source 2. The cell holder and photocell compartment of the spectrophotometer can be removed to expose a circular port from which the light emerges. This light is split by a Y-shaped fiber optic and conducted to the scanning and reference heads 6 and 14 by holding the common bundle of the Y concentric with the light output of the spectrophotometer and connecting the other two arms of the Y with the glass fiber bundles 4 and 12 which conduct the light beams to the scanning heads. For maximum sensitivity the slit width of the spectrophotometer is usually kept wide open and the appropriate wavelength set. It is advisable to darken the room during these scans but this is not necessary when the incandescent bulb is used as the light source.

The fiber optics make it possible not only to bring light close to a small defined area of the TLS plate, but, by maintaining the light-gathering fiber optic very close to the illuminated area, the fiber optic heads can also pick up the diffuse reflection from the uneven plate surface without excessive loss of energy through light scattering.

In our experience with the apparatus we found that to obtain optimum performance the scanning head should be kept at a fixed distance from the adsorbent. The procedure of sliding the Teflon-tipped scanning head on an inexpensive piece of plate glass proved to be the simplest and the most accurate. It cured the difficulty encountered with plastic TLC sheets, such as the Eastman Chromatogram, which may buckle and have to be held flat to obtain good scanning data. Chromatograms were not injured and could be scanned repeatedly. Thus, the cover glass allowed scans to be made on plates with adsorbents that flaked off very easily. On such plates, the cover glass was first placed on one corner of the TLC plate and slowly lowered onto the plate to avoid disturbing the absorbent; the same care had to be exercised in removing the cover glass. The cover glass (20 × 25 cm.) was larger than the TLC plate (20 × 20 cm.) to allow handling without getting smudges or fingerprint marks on the surface above the TLC plate. The cover glass was carefully wiped clean before placing it on a plate. Scans were made with cover glasses of different thicknesses, and results were satisfactory with 1.0 and 1.5 mm. thicknesses. Sensitivity fell off and excessive interference from room light was observed with greater thicknesses. Since the scanning head rests on Teflon which has a low coefficient of friction, it was possible to slide the scanning head directly on the absorbent when the absorbent was anchored firmly enough (e.g. the Eastman Chromatogram). However, this procedure was found to be unsatisfactory for several reasons. It could not be used with absorbents that were less firmly held; the fiber optic might be damaged if the Teflon broke loose; and chromatograms were frequently scratched when a stray absorbent particle or grit of some kind was caught between the head and absorbent layer during the scanning operation. If necessary or desirable the Teflon strip can be placed alongside the light-conducting area rather than on it, or the head can ride on a wheel fastened alongside the scanning head.

Figure 3:
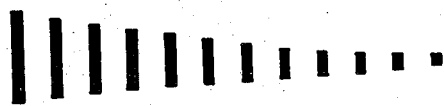
FIG. 3 is a representative of a plate used to measure response to variation in area at constant reflectivity (black matte paper rectangles) and to variation in reflectivity at constant area (ink spots).
Figure 3:
Figure 3:
Figure 4A:
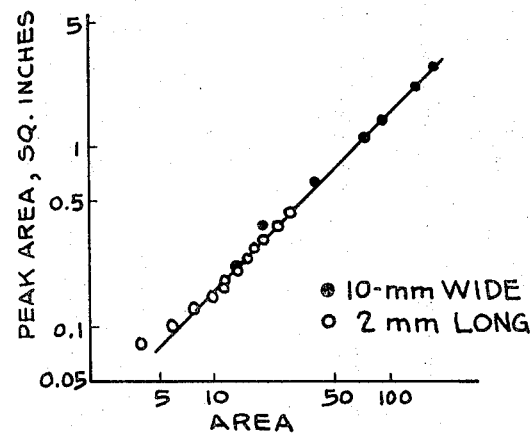
FIG. 4A is a plot of area of black matte paper rectangles vs. peak area measured manually by a planimeter.

Preliminary experiments indicated the performance of the instrument was satisfactory. The effects of varying spot area at constant reflectivity were measured by scanning an Eastman Chromatogram TLC Sheet having black matte paper rectangles of known dimensions superimposed as shown in FIG. 3. One row consisted of rectangles 2 mm. long and from 2 mm. to 18 mm. wide. A second row consisted of rectangles 10 mm. wide and 2 to 20 mm. long. The response was directly proportional to the area of the rectangles (slope = 1.0) regardless of the independent variations in length and width of the rectangles (FIG. 4A). This high degree of linearity indicated that a random arrangement of the glass fibers in the scanning head had been attained. The effects of varying reflectivity at constant area were measured by scanning six 1 cm. diameter ink spots on the same sheet. Spots of equal size but different reflectivity were obtained by spotting equal volumes of blue ink in water at six concentrations. A seventh spot of undiluted ink was used to establish an arbitrary value for zero reflectivity; the white surface of the sheet furnished the value for 100 percent reflectivity. All ink spot scans were carried out with a wavelength setting of 605 m$\mu$ on an ultraviolet spectrophotometer.

Figure 4B:
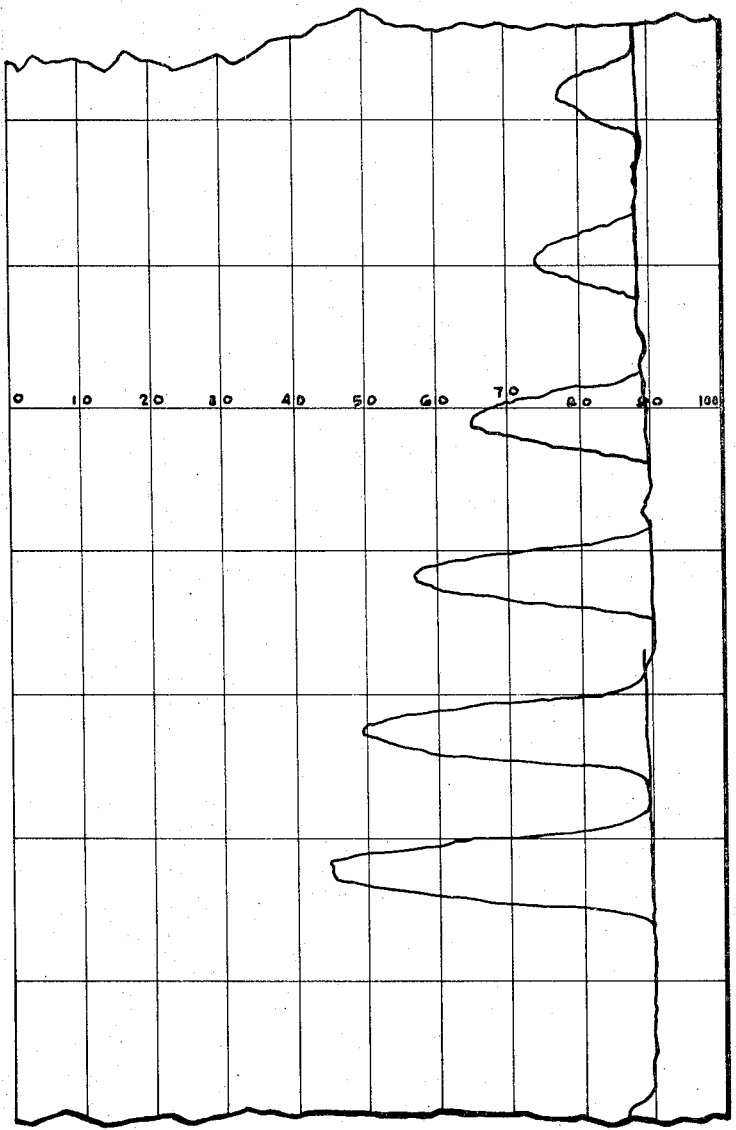
FIG. 4B shows a scan of the ink spots.

The ink spot data were used to calculate the Kubelka-Munk remission function $$\left[\frac{(1-r)^2}{2r}\right]$$

where $r$ is diffuse reflection. The log of this function vs. the log of the concentration gives a straight line relationship, which indicates that the major component of the recorded signal is due to diffuse reflectance (FIG. 4B).

Proper functioning of the instrument in measurements of the black rectangles and ink spots did not assure adequate results with spots obtained in the usual TLC analyses. It was necessary to determine how scanning measurements would be affected by variations in spot area, shape, and reflectivity which are inherent in the TLC process. A comparison of the errors arising from the chromatographic process with errors due to imperfections of the scanning technique was obtained by developing and making visible six 1 $\mu$g. spots of the pesticide methoxychlor on one plate and six 2 $\mu$g. spots of another pesticide, heptachlor epoxide on another. The spots on the finished chromatograms were individually scanned and then one spot on each plate was selected and scanned six times. The data on table 1 show that the relative standard deviations of the six replicates of methoxychlor and heptachlor epoxide were 11.34 and 16.2 percent, respectively, whereas those in the multiple scans of a single spot were 1.09 and 2.1 percent. These results indicate that the variability in preparing the TLC chromatogram is about 8 to 10 times that of the instrumental measurement.

Thirteen chlorinated insecticides in amounts ranging from 0.1 to 32 $\mu$g. were chromatographed either singly or in mixtures on silver nitrate impregnated alumina plates, and curves were constructed from the data obtained in scanning the resulting chromatograms. Most plots of peak area versus concentration were linear over a ten-fold concentration range with levels of 0.2 to about 10 $\mu$g. (FIGS. 5A—5K). Variations observed in scans of a series of concentrations of $p,p'$-DDT made on different TLC plates on different days (FIG. 5D) illustrate the need to run standards when making determinations. The plateau observed

TABLE I

[Reproducibility of Recorded Peak Areas from Strip Chart Scans of 1-$\mu$g. Spots of Methoxychlor and 2-$\mu$g. Spots of Heptachlor Epoxide on alumina-Coated Thin-layer Plates.]

| Methoxychlor [1] | | Heptachlor epoxide [2] | |
|---|---|---|---|
| Six replicates | Spot No. 2 [3] | Six replicates | Spot No. 3 |
| 115 | 135 | 0.21 | 0.29 |
| 122 | 138 | 0.29 | 0.30 |
| 99 | 135 | 0.32 | 0.30 |
| 118 | 138 | 0.28 | 0.30 |
| 120 | 135 | 0.28 | 0.31 |
| 141 | 136 | 0.22 | 0.30 |
| [4] 119±13.5 | [4] 136±1.48 | [4] 0.27±0.04 | [4] 0.30±0.006 |
| [5] 11.34 | [5] 1.09 | [5] 16.2 | [5] 2.1 |

Figure 5:
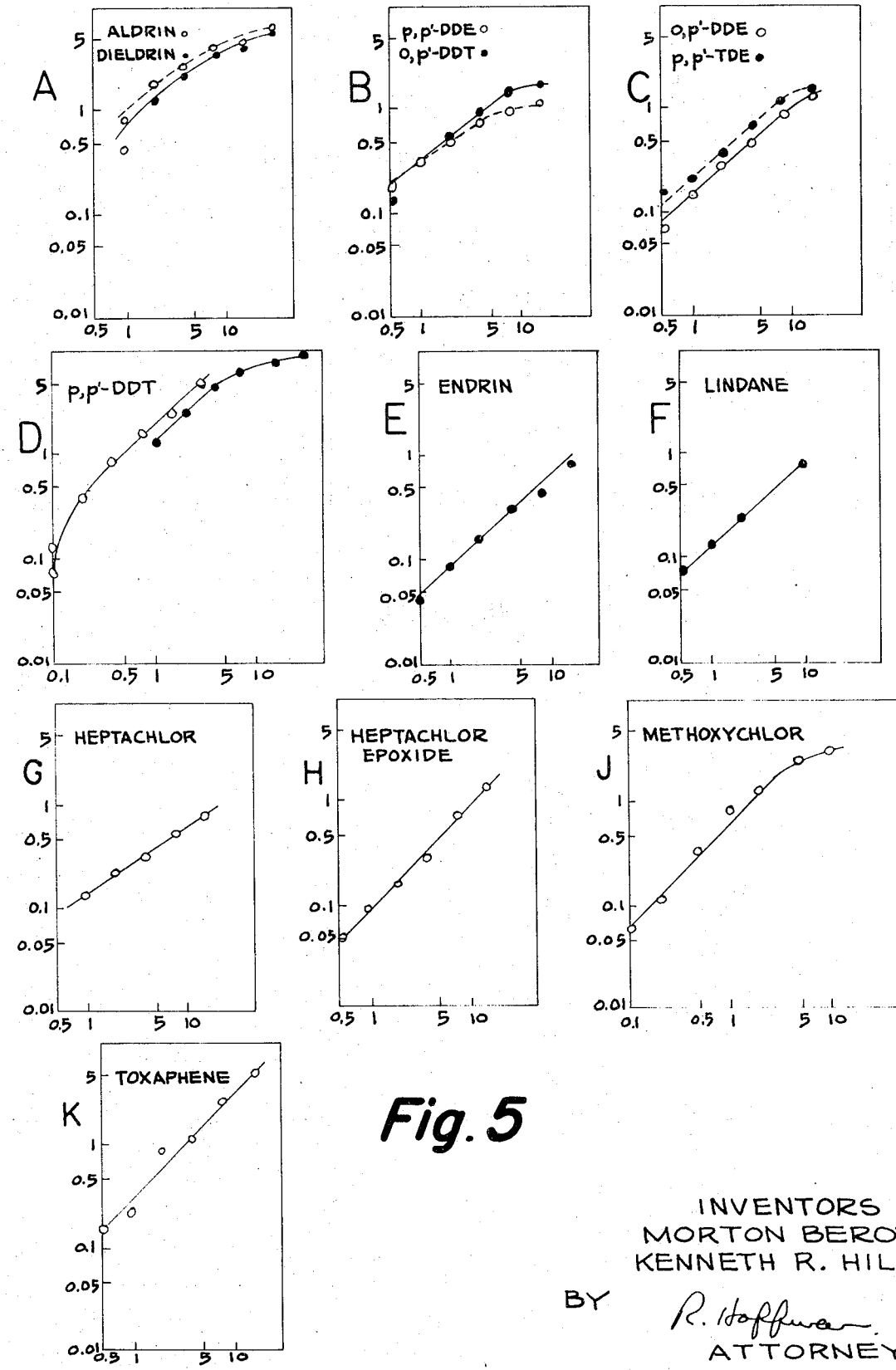
FIGS. 5A to 5K show the results of plotting peak area of pesticides vs. their concentrations.

[1] Areas measured with a Disc Integrator and given in integrator counts.
[2] Areas measured manually with planimeter and given in square inches.
[3] The difference in count number between the six replicates and spot No. 2 is a result of changing from a 1.5- to a 1.0-mm.-thick cover glass.
[4] Mean and Std. dev.
[5] $\sigma$ relative, percent.

above the 8 to 10 $\mu$g. level appears to be due to saturation of the reflectivity component, i.e. too great a concentration in a limited area. It was found that this defect could be corrected by applying the more concentrated test solutions to the TLC plates over a greater area, e.g. as streaks or a row of small overlapping spots. When this procedure was followed for endin, heptachlor epoxide, and toxaphene, a straight line was obtained as seen in FIGS. 5E, 5H and 5K.

A test of the analytical capabilities of the instrument in the presence of interference from crop extractives was provided by an analysis of partially cleaned-up lettuce extract fortified with bensulide (0.05 p.p.m.) and bensulide oxon (0.10 ppm). Plots of the standards run simultaneously on the same chromatograms gave straight lines with slopes of 1.0. From these plots, the measured values obtained by scanning with light at 515 m$\mu$ were 1.8 $\mu$g. (0.04 p.p.m.) for bensulide and 4.7 $\mu$g. (0.09 p.p.m.) for bensulide oxon, in fair agreement with the known values. These compounds were also scanned on TLC plates with the incandescent light source but the reflection measurements were less reliable. The use of monochromatic light can therefore aid in these determinations. Also, the entire spectrum of the spot can be determined by checking absorbance at each wave length and plotting the results.

The fiber optic technique for scanning thin-layer chromatograms by diffuse reflectometry can be used to obtain reliable quantitive analysis of pesticide residues especially when the chromatograms are prepared carefully. The errors arising from plate preparation far exceed those from instrumental and measurement sources. The variations observed from plate to plate require the use of calibration curves derived from standards run on the same plate as the sample.

Fiber optic scanning of TLC plates is potentially useful for a wide variety of analytical applications. The apparatus is not costly, requires no special skill to use, is easily assembled, and is simple and trouble-free in operation. The procedure is rapid and is likely to be applicable to a wide variety of analyses, including multicomponent ones. No scraping of adsorbent and elution of substance with solvent is required. With respect to multicomponent analyses, all the compounds with given chromogenic groups may be made to appear when a TLC plate is treated with one or more chemicals to make spots visible; e.g. in pesticide analysis of environmental samples, spots of metabolites and breakdown products may be brought out. In comparison, gas chromatography is not used to determine certain compounds, especially polar ones, because they do not chromatograph well or the chromatography cannot be made quantitative. TLC is also gentle enough to be applied in determinations not amenable to gas chromatography (e.g., thermally unstable and high molecular weight compounds). TLC is usually not as sensitive and frequently not as specific as gas chromatography with the highly specific detectors (e.g. flame photometric and electron capture); this lack of sensitivity and specificity makes it necessary to use a good "clean up" of the crop sample. However, many agents for making spots visible on TLC plates have been made available to improve specificity, and the analyst has the advantage of being able to inspect separations on a TLC plate visually in interpreting his recording of a scan. The potential exists for determining the amounts of compounds in overlapping spots by scanning at two wavelengths and also for making analyses outside the visible region with quartz or infrared optics. Likewise, fluorometry and fluorometric quenching with monochromatic light source and a light filter on the photocell, are certainly feasible. There also appears to be no reason why the technique cannot be used with paper and other chromatograms, electropherograms, etc. In the ultraviolet region the use of an ultraviolet transmitting silica or plastic sheet may be employed instead of the 20 × 25 mm. glass plate. Any other monochromatic source, e.g. light filters, may be used.

We claim:
1. Apparatus for scanning thin layer and paper chromatograms on adsorbent-coated surfaces comprising:
  a. a light source and a first photocell for receiving transmitted light from said light source;
  b. a first fiber optic conduit of Y-shaped configuration having the end of one arm thereof adjacent the light source, the end of the other arm being adjacent the first photocell, said conduit arms forming a common bundle of randomly dispersed optically conducting fibers in the base of the Y, and the end of the base of said Y-shaped configuration being in a scanning position in proximity to the chromatogram;
  c. a second fiber optic conduit of Y-shaped configuration having the end of one arm thereof adjacent the light source, the end of the other arm being adjacent a second photocell, said conduit arms forming a common bundle of optically conducting fibers in the base of the Y, and the end of the base of said Y-shaped configuration being in a scanning position in proximity to a blank space adjacent to the chromatogram;
  d. a scanning head mounted at the end of each base of the Y, each of said scanning heads forming the terminus of the Y-shaped fiber optic conduit, each of said Y-shaped fiber optic conduit serving to conduct light from the light source to the surface of the chromatogram and then to conduct reflected light from said surface to their respective photocells;
  e. means interposed between said scanning heads and the adsorbent surface to maintain the scanning heads a constant distance from said surface; and
  f. circuitry and recording means connected to the photocells for measuring and recording the response of each of said photocells to light transmitted to it by said fiber optic conduits.

2. The apparatus of claim 1 in which sliding means are attached to the scanning heads to facilitate sliding over the means for maintaining a constant distance between said heads and the adsorbent surface.

3. The apparatus of claim 1 in which the circuitry is a simple, four-arm Wheatstone bridge in which each of the photocells forms an arm of the bridge.

4. The apparatus of claim 1 in which the light source is an incandescent bulb.

5. The apparatus of claim 1 in which the light source is essentially monochromatic.